(12) United States Patent
Svedman et al.

(10) Patent No.: US 10,396,928 B2
(45) Date of Patent: Aug. 27, 2019

(54) USER EQUIPMENT CELL SEARCH ASSISTANCE BY SYNCHRONIZATION SIGNAL BURST

(71) Applicants: ZTE Wistron Telecom AB, Kista Science Tower (SE); ZTE CORPORATION, Shenzhen (CN)

(72) Inventors: Patrick Svedman, Stockholm (SE); Peng Hao, Shenzhen (CN); Xing Liu, Xian (CN)

(73) Assignees: ZTE WISTRON TELECOM AB, Kista (SE); ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/787,452

(22) Filed: Oct. 18, 2017

(65) Prior Publication Data
US 2018/0109345 A1 Apr. 19, 2018

(30) Foreign Application Priority Data
Oct. 19, 2016 (WO) ................ PCT/CN2016/102544

(51) Int. Cl.
| H04J 11/00 | (2006.01) |
| H04L 27/26 | (2006.01) |
| H04W 56/00 | (2009.01) |
| H04W 72/04 | (2009.01) |
| H04W 72/12 | (2009.01) |

(52) U.S. Cl.
CPC ....... *H04J 11/0079* (2013.01); *H04J 11/0093* (2013.01); *H04W 56/0015* (2013.01); *H04W 72/042* (2013.01); *H04W 72/1289* (2013.01); *H04J 2011/0096* (2013.01); *H04L 27/2678* (2013.01)

(58) Field of Classification Search
CPC ...... H04J 3/0658; H04J 11/00; H04J 11/0073; H04J 11/0076; H04J 11/0079; H04L 7/08; H04W 56/00; H04W 56/001; H04W 72/085; H04B 7/2125; H04B 7/2126
See application file for complete search history.

(56) References Cited

U.S. PATENT DOCUMENTS

| | | | |
|---|---|---|---|
| 2013/0089065 A1* | 4/2013 | Koorapaty | H04W 56/001 370/330 |
| 2014/0092861 A1* | 4/2014 | Gao | H04L 27/2655 370/330 |
| 2015/0003348 A1* | 1/2015 | Ishii | H04L 27/2601 370/329 |
| 2015/0148053 A1* | 5/2015 | Patel | H04W 72/0426 455/452.1 |
| 2017/0085345 A1* | 3/2017 | Dinan | H04L 1/0026 |
| 2017/0105185 A1* | 4/2017 | Chen | H04W 56/00 |
| 2017/0317681 A1* | 11/2017 | Liu | H04W 76/28 |

(Continued)

FOREIGN PATENT DOCUMENTS

WO 2013/028629 A2 2/2013

*Primary Examiner* — Nizar N Sivji
(74) *Attorney, Agent, or Firm* — Duane Morris LLP

(57) ABSTRACT

A method and system for obtaining system information from a plurality of cells in a network based on a downlink (DL) synchronization signal block (SB) burst used by the plurality of cells to transmit information to user equipment (UE) wherein the DL SB burst includes a plurality of SB's each containing synchronization information for one or more of the plurality of cells.

26 Claims, 6 Drawing Sheets

(56) References Cited

U.S. PATENT DOCUMENTS

| | | | | |
|---|---|---|---|---|
| 2017/0318473 | A1* | 11/2017 | Futaki | H04W 16/14 |
| 2017/0318559 | A1* | 11/2017 | Islam | H04L 5/0048 |
| 2017/0325260 | A1* | 11/2017 | Guo | H04L 5/0007 |
| 2018/0279211 | A1* | 9/2018 | Lunttila | H04W 48/16 |
| 2018/0295594 | A1* | 10/2018 | Huang | H04W 56/001 |

* cited by examiner

USER EQUIPMENT CELL SEARCH ASSISTANCE BY SYNCHRONIZATION SIGNAL BURST

TECHNICAL FIELD

This disclosure relates generally to wireless communication systems and methods and, more particularly, to systems and methods for transmitting system information from multiple cells within a network to a user equipment device (hereinafter "UE").

BACKGROUND

The following acronyms are used in this disclosure:
CoMP Coordinated Multipoint
CP Cyclic Prefix
LTE Long Term Evolution (4G)
MAC Medium Access Control
NR New Radio (5G)
OFDM Orthogonal Frequency Division Multiplexing
PCI Physical Cell Identity
PHY Physical
PSS Primary Synchronization Signal
RRC Radio Resource Control
SB SS Block
SFN Single Frequency Network
SI System Information
SINR Signal to Interference plus Noise Ratio
SNR Signal to Noise Ratio
SS Synchronization Signal
SSS Secondary Synchronization Signal
TRP Transmission Reception Point
UE User Equipment
UMTS Universal Mobile Telecommunication System (3G)

In order to allow for flexible operation of wireless communication systems, such as LTE, UMTS and NR networks, for example, the network broadcasts system information (SI) to user equipment (UE). The SI may include information necessary for the UE to access the network, such as system bandwidth and random access configuration information, for example. The SI may be divided into different parts, for example into system information blocks as in LTE, or into minimal or other types of SI, as in NR. Furthermore, different SI parts may be delivered in different ways, for instance by broadcasting in one cell, single-frequency-network (SFN) transmission in multiple cells, multi-cast transmission to a set of UEs or unicast (dedicated) transmission to a single UE.

In a typical initial access procedure, a UE starts to search for synchronization signals (SS), where different SS typically correspond to different cells. Typically, different cells can be distinguished by different IDs, which are embedded in the SS. As discussed herein, terminology commonly used when describing an LTE system will be used, such as "Physical Cell Identity (PCI)." It should be understood, however, that the discussion of LTE systems is merely exemplary, and the present disclosure is not limited to LTE systems. In some systems, the SS is divided into multiple parts, where different parts carry an identity, and the PCI is a combination of the partial identities. In LTE, for example, the SS is divided into PSS and SSS, which both carry independent identities, and the PCI is a combination of the PSS identity and the SSS identity.

An SI validity area is a set of cells in which some or all SI is valid, as described in 3GPP TSG-RAN WG2 Meeting #95 (Aug. 22-26, 2016) document R2-165202 entitled, "Quantitative Analysis of On-demand SI Delivery," the contents of which are incorporated herein it its entirety. By default and in state-of-the-art systems, the SI validity area is a single cell. However, by defining an SI validity area larger than one cell, a UE may avoid receiving and decoding the same (some or all) SI repeatedly when it moves between cells in the set. With a single-cell SI validity area, a UE needs to decode the SI each time it moves to a new cell, since it cannot assume that the SI of the new cell is the same as the SI of a previously received and decoded SI of another cell. Note that the SI validity area may be different for different parts of the SI as described in 3GPP TSG-RAN WG2 Meeting #95bis (Oct. 10-14, 2016) document R2-166353 entitled, "NR System Information Areas for Other SI," the contents of which are incorporated herein it its entirety. For example, one SI part could be valid in a small number of cells, e.g. a single cell, and another SI part could be valid in a large number of cells. A group of cells for which a part of the SI is valid is also called a SI group herein.

SUMMARY OF THE INVENTION

Transmissions from different cells (e.g., base stations) to a UE can often be coordinated and synchronized. In such scenarios, it may be useful for UEs to be made aware of this, in particular to improve cell search performance by the UEs. The present disclosure describes various methods to inform a UE of such information. Also various UE procedures to exploit this information are disclosed.

DETAILED DESCRIPTION OF EXEMPLARY EMBODIMENTS OF THE INVENTION

In some scenarios, the SS's of different cells are transmitted in a coordinated manner. For example, in some embodiments, corresponding SS's of different cells are transmitted in a certain order in time. In one embodiment, a node transmitting multiple SS's can use analog and/or hybrid analog/digital beamforming, as discussed in further detail below.

Figure 1:
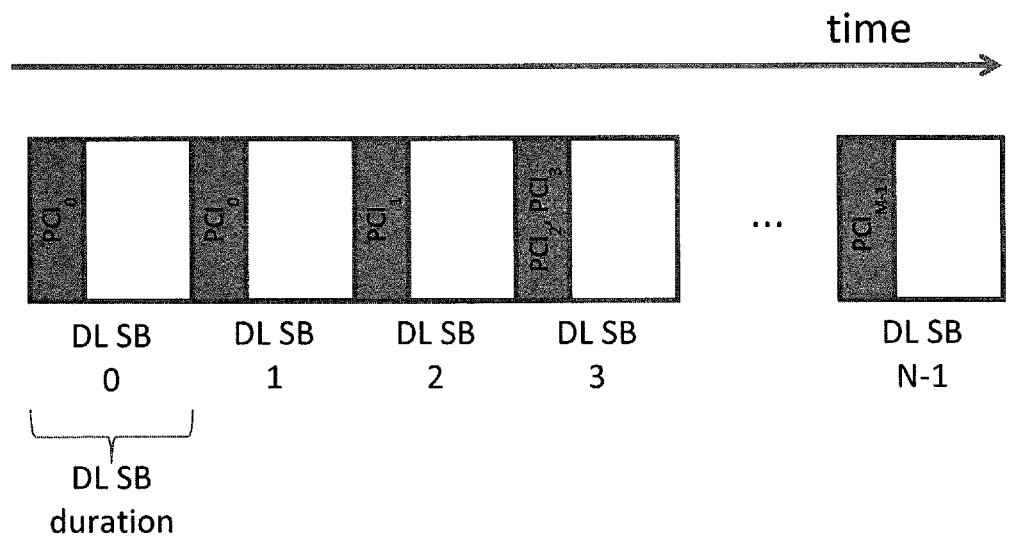
FIG. 1 illustrates a plurality of sequential downlink (DL) SS blocks (SBs) each containing synchronization signals associated with one or more PCI's, in accordance with some embodiments of the invention.

In some embodiments, the SS's of different cells are transmitted in one or more downlink (DL) SS blocks (SB's), where SB's are transmitted synchronously, but with certain nominal time-differences, for example, as shown in FIG. 1. In various embodiments, a DL SB may contain additional information or signals such as a physical layer broadcast channel (PBCH) as well as other types of signals. In various embodiments, the transmission of the different DL SBs is only approximately according to the nominal time differences. Embodiments where this can occur is when different DL SBs are transmitted by different nodes, TRPs or antennas that are imperfectly synchronized and/or coordinated. Only approximately synchronized/coordinated DL SB transmission occurs also in some embodiments where different DL SBs are transmitted from the same TRPs, for example when the TRP uses different or at least partially different hardware to transmit a DL SB that is not fully synchronized. FIG. 1 illustrates a burst of DL SB's in which each DL SB contains a SS that is associated with a physical cell ID (PCI), in accordance with various exemplary embodiments of the present invention. Such a burst of DL SB's is also referred to as a "SS burst" herein.

Figure 10:
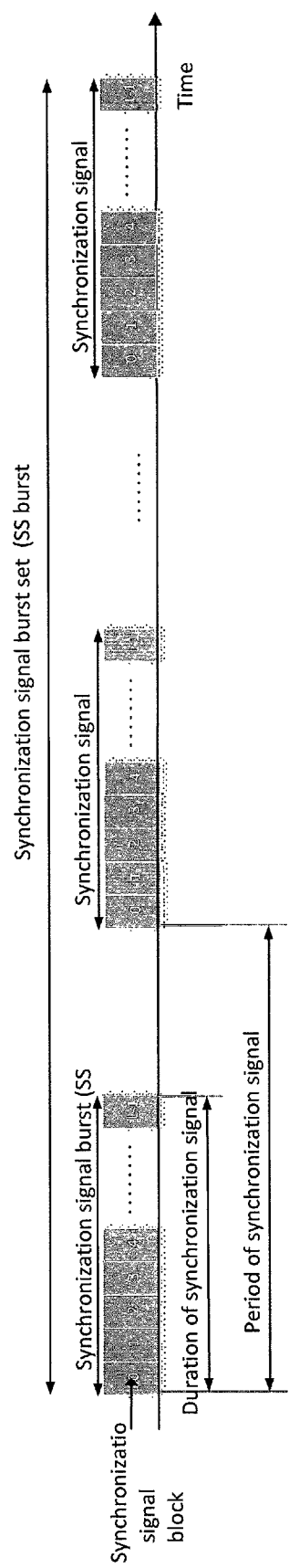
FIG. 10 illustrates an exemplary SS burst set, in accordance with some embodiments of the invention.

In various embodiments, one or more SS bursts compose an SS burst set. In various embodiments, the number of SS bursts within an SS burst set is finite. In some embodiments, the transmission of SS burst sets is periodic. In some embodiments, the transmission of SS burst sets is aperiodic. In some embodiments, the transmission of SS burst sets can be turned on and off. In some embodiments, this can be indicated to a UE. In some embodiments, it is indicated to a UE by another cell, for example in SI from the cell or in a UE-specific configuration received from the cell. In various embodiments, the principles of the invention described herein with respect to a "SS burst" can also be applied to a larger "SS burst set," as would be understood by a person of skill in the art. FIG. 10 illustrates an exemplary SS burst set that includes a plurality of SS bursts (3 shown), each burst having a specified duration, and a specified period between bursts denoted as "period of synchronization signal burst" in FIG. 10.

As shown in FIG. 1, the first two DL SBs 0 and 1 repeats the SS associated with the same PCI ($PCI_0$). Subsequent DL SB's in the SS burst such as DL SB 2 contains a different SS specifying a different PCI (e.g., $PCI_1$). In some embodiments, one or more DL SB's, such as DL SB 3, contain two different SS's each associated with a different PCI (e.g., $PCI_2$ and $PCI_3$). In some embodiments, two or more SS's contained in a single DL SB are transmitted simultaneously, or approximately simultaneously. In general, the number of DL SBs in an SS burst (e.g., N in FIG. 1) does not have to be the same as the number of PCIs transmitted in the SS burst (e.g., M in FIG. 1). The number can be larger, equal or smaller, depending on the number of repeated DL SB's (e.g., DL SB 0 and DL SB 1 in FIG. 1) and/or simultaneous transmission of multiple PCI's by a single DL SB (e.g., DL SB 3) implemented by an SS burst.

In some embodiments, the nominal time differences between SB's within an SS burst may be described by the time difference between the starting points of respective SB's within the SS burst. In some embodiments, the nominal time differences between SB's, assumed by a UE depend on the carrier frequency in which the SB's are transmitted. In some embodiments, the nominal time differences between DL SBs are integer multiples of a smaller time interval that is predefined for a certain range of carrier frequencies. In some embodiments, such a smaller time interval can be provided by the DL SB duration, for example, as shown in FIG. 1. In some embodiments, the time differences assumed by a UE on a carrier can be configured by SI provided on the same or a different carrier, or predetermined in accordance with a UE-specific configuration.

Furthermore, even though signals in different SBs are transmitted in a perfectly synchronized manner, e.g. such that they are separated in time an integer times a smaller time interval, they could still be received with a different time difference. This may occur in a scenario in which signals in different SBs are transmitted from different TRPs or antennas. This may also occur in a scenario in which different signals are transmitted synchronously but with different transmission schemes. The different transmission schemes could for instance involve transmissions using different multi-antenna transmission schemes, such as different beamforming schemes. With different beamforming schemes, different signals could travel different paths in the radio propagation channel, thereby resulting in different reception times at the UE receiver.

The time difference between DL SBs received by a UE may in some embodiments be approximately the nominal time difference. For example, the time difference between received DL SBs may be approximately the nominal time difference if the deviation (D) from the nominal time difference is small in comparison with the nominal time difference (T). For example, if D/T is less than a predetermined value (e.g., 0.1), then the received time difference can be seen as approximately equal to the nominal time difference. In one example, the nominal time difference between DL SBs is an integer number of OFDM symbols, i.e. the smaller time interval equals one OFDM symbol. In some embodiments, the time difference deviation between approximately and exactly an integer number of OFDM symbols is smaller than the duration of the cyclic prefix (CP) in the OFDM symbol. In other words, the received time difference can be seen as approximately equal to the nominal time difference if the deviation D is smaller than the CP.

In various embodiments, the nominal time-domain structure of signals in different DL SBs is the same. For example, the SS within an DL SB is transmitted at the same time in relation to the DL SB starting point. For example, as shown in FIG. 1, an SS is transmitted at the beginning of a DL SB. In various embodiments, a UE has prior knowledge of the structure of the SS burst and DL SBs, including various related time differences. In various embodiments, such structure is fully or partly predefined in the communications standard, e.g. as specified in 3GPP. In various embodiments, the knowledge is obtained from SI or from a UE-specific configuration. Even though a UE receives signals in different DL SBs approximately in expected time instants, e.g. separated by an integer number of a smaller time interval plus some deviation, such prior knowledge still provides useful information that can be used to reduce the amount of time and processing power expended by a UE when searching for signals, e.g. a SS search effort, compared to a signal search effort without any prior knowledge.

Figure 2:
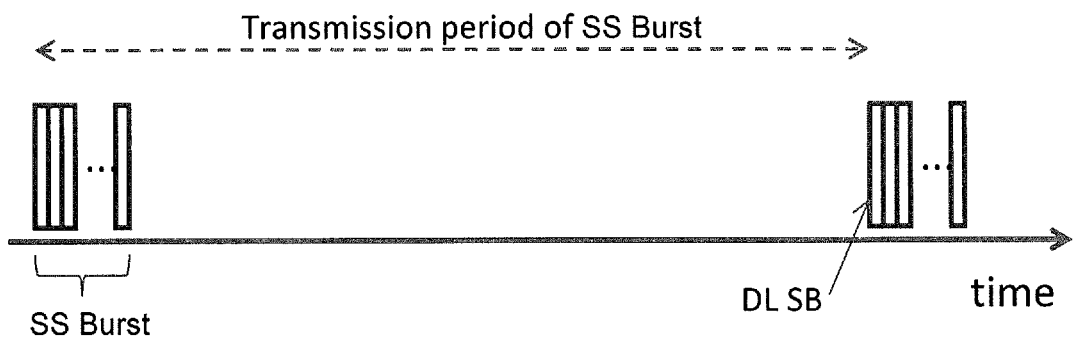
FIG. 2 illustrates an SS burst that are periodically transmitted, in accordance with some embodiments of the invention.

In some embodiments the SS burst could be transmitted periodically, for example with a period of 40, 80 or 100 ms between DL SB burst transmissions, as illustrated in FIG. 2 (In embodiments with a finite number of SS bursts in an SS burst set, the SS burst set instead can be periodic as described here). A single DL SB, on the other hand, could consist of a small number of OFDM symbols, for instance, 1, 2, 3 or 4 OFDM symbols. With LTE or NR numerology, this would correspond to approximately 71.4 (1 OFDM symbol), 142.8 (2 OFDM symbols), 214.2 (3 OFDM symbols) or 285.6 (4 OFDM symbols) microseconds. With upscaled numerology with a factor K, i.e. K times higher subcarrier spacing and K times shorter symbols, the DL SB duration would be downscaled with a factor K. Signals in consecutive DL SBs in an SS burst would consequently be separated by (approximately in some embodiments) an integer times the reduced DL SB duration, in accordance with various embodiments.

In various embodiments, the SS burst is not continuous, i.e. the burst has some time gaps which do not contain DL SBs. Still, it would be considered an SS burst, if the gaps each have a time duration at most a few, e.g. 10 times, a DL SB duration, in some embodiments. However, with a periodically transmitted SS burst as illustrated in FIG. 2, the SS burst is repeated with a period significantly larger than the DL SB duration, for example 100 or 1000 times larger. Hence, a single SS burst will typically not span across such a long period of time. Instead, the SS burst will be determined to be repeated after a predetermined duration of time (e.g., 5 ms, 20 ms, 40 ms, 100 ms)). Furthermore, in various embodiments, each individual DL SB in the SS burst are repeated in accordance with the SS burst period. Note that in embodiments with a finite number of SS bursts in an SS burst set, the SS burst periods above may refer to SS burst set periods, in accordance with various embodiments.

In some embodiments, a reason to use an SS burst to transmit signals is that analog (sometimes called RF beamforming) or hybrid beamforming is used in the DL transmission. In such systems, there is limited flexibility in the signals that can be transmitted at the same time. For instance, if analog beamforming is used then only one beam per transmitter RF chain can be used. Hence, in order to transmit signals on a large number of beams, a burst of SBs is needed. Different beams can then be used in different DL SBs. In some embodiments, different nodes transmit signals in the same or different DL SBs, for instance, different SS's in one SB or the same SS in different SBs. The signals transmitted by the different nodes may still be considered as part of the same SS burst if the transmissions are synchronized well enough, as described above.

However, it should also be noted that different DL SBs can be used to transmit signals (e.g. SS's) on the same beam, referred to herein as "repetition." This can also be useful, in order to enable signal accumulation at the receiver, which can improve the received SNR. In some embodiments, the same signal (e.g. a SS) is repeated in multiple DL SBs, but with different transmission schemes, such as different beams.

It should also be noted that it may not always be necessary to use different DL SBs to transmit signals corresponding to different cells. Instead, signals corresponding to different cells, e.g. SS with different PCI and signals carrying SI for different cells, could be transmitted in the same DL SB in various embodiments. In some embodiments, such signals transmitted in the same DL SB are transmitted synchronously.

A UE without any prior knowledge at the time of initial cell detection and access, for example, may have to perform an extensive search for compatible cells, covering many frequencies and times. Cell search in general is a complex and power consuming task, and reducing cell search time can be beneficial for UE power consumption and battery life. The present invention helps reduce the UE cell search effort, thereby improving UE power consumption and battery life. In some embodiments, the cell detection performance can also be improved, e.g., the detection reliability. In some embodiments, the additional information may be used to detect cells faster, i.e. detection time can be improved.

A UE that has detected a cell, i.e. an SS with a PCI, does not generally know anything about the SS or neighbor cells with other PCIs. In order to discover neighbor cells, the UE needs to perform extensive cell searches. However, if signals from multiple cells (e.g. SSs) are transmitted in an SS burst, and if the UE has information about the SS burst, then the UE can perform a more efficient cell search. Below, we consider various embodiments in which a UE can be informed of the existence of an SS burst and its structure, including the time domain structure.

In various embodiments below, a UE receives a list of cell information This list could be obtained in SI from a cell on the same or a different carrier frequency currently being used by the UE. The SI could be broadcasted in the cell, transmitted via a unicast transmission to the UE in response to a UE request, or multicast or broadcast in response to a request from a UE. The list could also be received in a dedicated manner from a cell to which the UE is connected. In some embodiments, the information is received in advance from a cell to which the UE was previously connected.

Various Embodiments of Lists and Indications

In various embodiments, a list of cell information a UE receives includes a list of neighbor cell information, similarly as described in the LTE protocol (See e.g., 3GPP TS 36.331 Evolved Universal Terrestrial Radio Access (E-UTRA); Radio Resource Control (RRC); Protocol specification. Note that neighbor cells are defined in relation to a cell from which the UE received the list, which is referred to as the "serving cell." In some embodiments, the UE may not be presently connected to the serving cell if, for example, an IDLE UE previously received the neighbor cell information from SI. In LTE, the neighbor cell information includes the PCI, but not any information about the timing relation between the SS corresponding to different cells, such as the timing differences between DL SBs discussed above.

In various embodiments, a list of cell information need not contain a list of neighbor cell information, which means the list does not assume a particular serving cell.

In various embodiments, the list of cell information contains timing information about the relative time differences of the SSs of the cells. In some embodiments, the list includes a binary indicator if a cell belongs to the same SS burst as the serving cell. In some embodiments, the list includes an indicator of the DL SB index (or DL SB indices) on which a cell transmits a SS. In some embodiments, this index is indicated in relation to the serving cell SS, while in some embodiments it is indicated in relation to the first DL SB in the burst.

In some embodiments, the cell information indicates with a binary indicator if the cell belongs to the same SI group as the serving cell. In some embodiments, the cell information includes vector of binary indicators, where each element in the vector indicates if the cell belongs to the same SI group regarding a particular part of the SI.

In some embodiments, the cell information indicates to which SI group the cell belongs, which may be different from the SI group of the serving cell. In some embodiments, the cell information indicates to which SI groups the cell belongs for multiple parts of the SI, which may be the same SI group of the serving cell for some parts of the SI and different for other parts of the SI.

In various embodiments, different cells belonging to the same SI group indicates that the different cells transmit their respective SS's in the same SS burst. In some embodiments, the belonging of different cells to the same SI group does not indicate that they transmit their respective SS's in the same SS burst. In some embodiments, the SI group information explicitly indicates that an SI group is such that its member cells transmit SS's in the same SS burst.

Figure 3:
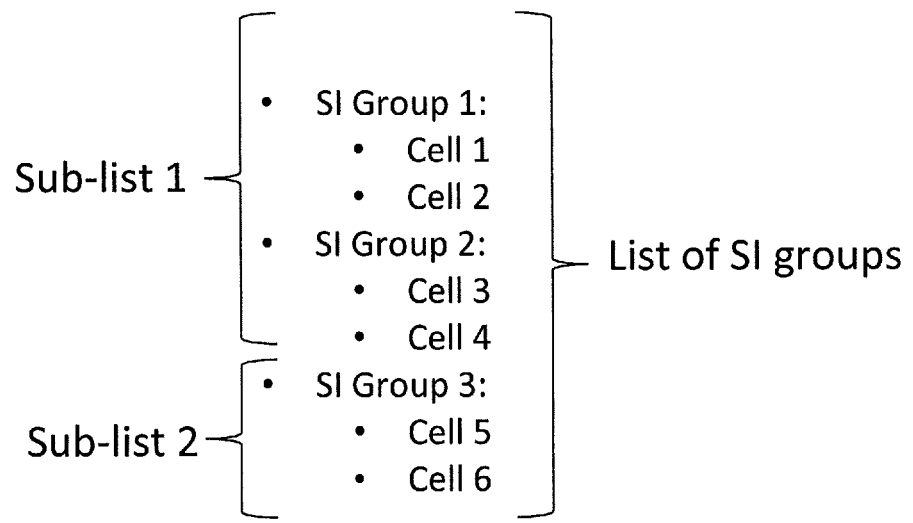
FIG. 3 illustrates a list of three SI groups divided into two sub-lists, in accordance with some embodiments of the invention.

FIG. 3 illustrates a list of SI groups wherein the SI groups are further divided or categorized into sub-lists, in accordance with some embodiments. In some embodiments, SI groups in a sub-list contain cells that transmit SS's in a SS burst. In some embodiments, the DL SB burst is specific for the SI group, i.e. only cells in the SI group transmit SS's in the DL SB burst. In some embodiments, the DL SB burst can include cells from multiple SI groups.

Figure 4:
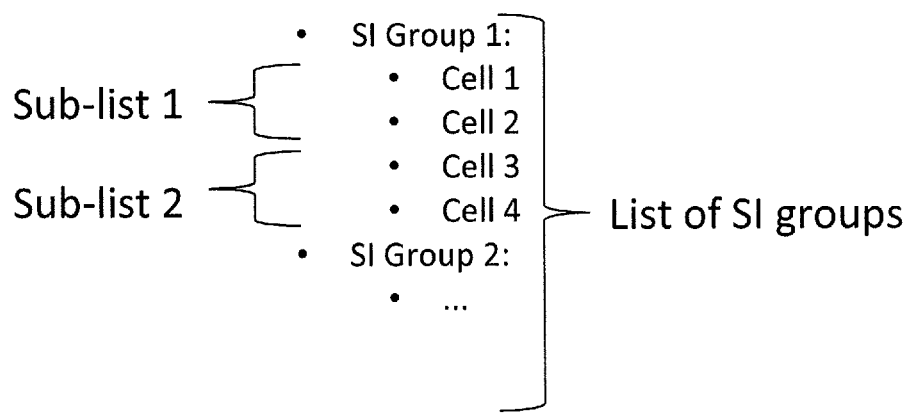
FIG. 4 illustrates a list of cells in a SI group divided into two sub-lists of cells within the SI group, in accordance with some embodiments of the invention.

A list of SI groups is illustrated in FIG. 4, in accordance with various embodiments. The list of cells in an SI group is divided into sub-lists. In some embodiments, cells in a sub-list (which may be empty) transmit SS's in the same SS burst. In some embodiments, cells in sub-lists from different SI groups transmit SS's in the same DL SB burst. In some embodiments, a cell can be listed in two or more different SI groups. This could be useful when different SI groups correspond to different parts of the SI.

Figure 5:
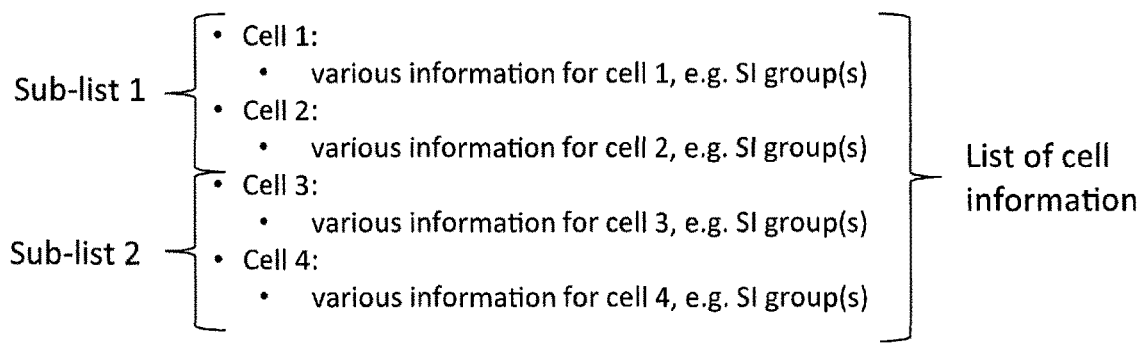
FIG. 5 illustrates a list of cell information for a plurality of cells (e.g., neighboring cells) wherein the list of cell information is further divided into multiple sub-lists of cell information, in accordance with some embodiments of the invention.

In some embodiments, a list of cell information, e.g. a list of neighbor cell information, is divided into multiple sub-lists of cell information, as illustrated in FIG. 5. In some embodiments, the cell information includes SI group information. In some embodiments, a sub-list (that may be empty) lists cells that transmit SS's in the same SS burst as the serving cell. For example, sub-list 1 in FIG. 5 lists cells transmitting SS's in the same SS burst as the serving cell. In some embodiments, a sub-list (that may be empty) lists cells in an SI group that transmits SS's in the SS burst of the indicated SI group. For example, sub-list 1 in FIG. 5 can list such cells, which means that cell 1 transmits a SS in the SS burst corresponding to the indicated SI group. Another sub-list (that may be empty) may list cells in an SI group that do not transmit SS's in the SS burst of the SI group. For example, sub-list 2 in FIG. 5 can list such cells, in accordance with some embodiments.

In some embodiments, an indication of an SI group is in the form of a list of cells (e.g. in the form of PCIs). In some embodiments, such a list is divided into multiple sub-lists (which may be empty), where the members of a sub-list transmit SS's in the same SS burst. In some embodiments, the order of such a sub-list indicates the DL SB in which the corresponding SS's are transmitted in the SS burst. For example, the first PCI in the sub-list is transmitted in the first DL SB, the second PCI in the sub-list is transmitted in the second DL SB, etc. In some embodiments, the sub-list indicates for a listed cell the DL SB index in which its SS is transmitted. In some embodiments, a sub-list also indicates the number of consecutive DL SBs on which the same SS of the same cell is repeated within the same SS burst.

In various embodiments, a SI group indication is in the form of a list of SI group information, where an entry in the list corresponds to an SI group. In some embodiments, the list is divided, e.g. into sub-lists, such that it indicates that some of the SI groups in the list transmit SS's within the same SS burst. In some embodiments, such an indication means that the cells in an indicated SI group transmit SS's within the same SS burst. In some embodiments, such an indication further indicates that the cells in an indicated SI group transmit SS's in the same SS burst as cell(s) in another indicated SI group. It may be indicated that some of the SI groups do not transmit SS's within the same SS burst. In various embodiments, where it is indicated that an SI group transmits SS's within the same SS burst, a particular one or more DL SB(s) in which the SS for a cell is transmitted may be further indicated for a cell within the SI group. It may also be indicated if the SS of a cell is repeated in multiple consecutive DL SBs within a burst.

Note that multiple different SS bursts may be transmitted in a network, typically by different sets of cells. Such different SS bursts may typically not be synchronized as well as the transmissions of DL SBs within a SS burst.

In some embodiments, a cell indicates (e.g. in SI) whether its SS is transmitted in a SS burst, without explicitly indicating the other cells. In some embodiments, the cell further indicates (e.g. in SI) the SS index in which its SS is transmitted. In some embodiments, a cell (e.g. in SI) indicates the length of the SS burst. In some embodiments, a cell indicates the detailed structure of the DL SB, e.g. if it is discontinuous and/or the time structure of those discontinuities.

Various Embodiments of UE Procedures

This section describes various embodiments of UE procedures. Note that the UE state may be idle or connected, e.g. connected active or connected inactive, in various embodiments.

Figures 6A, 6B:
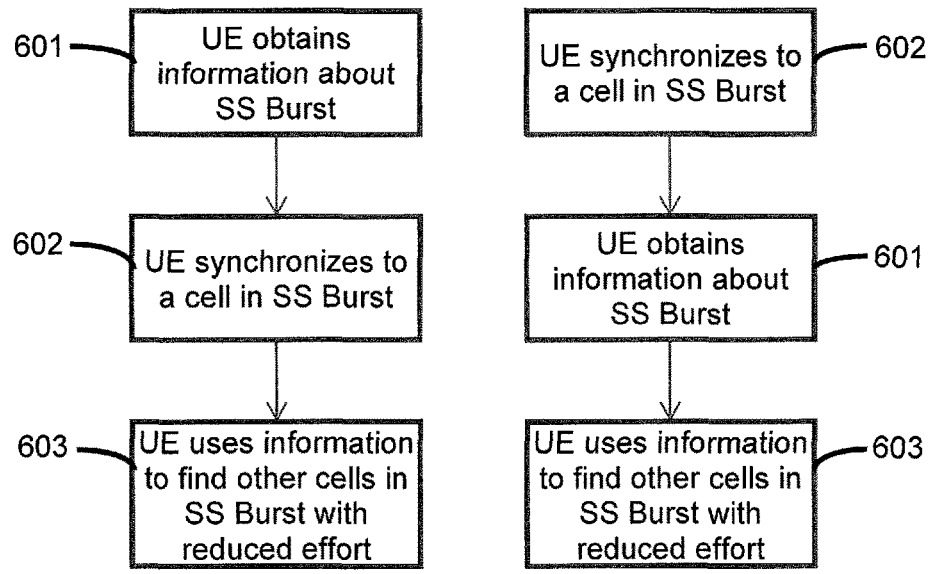
FIGS. 6A and 6B illustrate respective flowcharts of methods of obtaining information about a DL SB by a UE, in accordance with some embodiments of the invention.

FIGS. 6A and 6B illustrate two exemplary high-level embodiments related to the UE obtaining information about a SS burst, in accordance with various embodiments. Referring first to FIG. 6A, at step 601, the UE obtains SS burst information first and then, at step 602, the UE detects a cell in the SS burst and synchronizes to it. At step 603, the UE uses the information obtained at step 601 to find other cells in DL SB burst with a reduced amount of effort. The process illustrated in FIG. 6B is similar to that of FIG. 6A, except that step 602 is performed prior to step 601 in FIG. 6B. The order of steps is not relevant to various embodiments of the invention.

Figure 7:
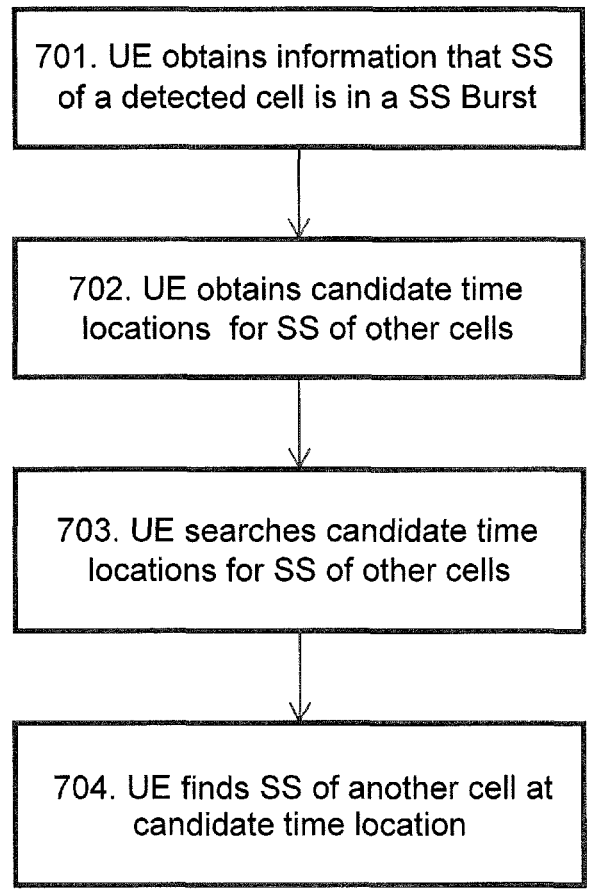
FIG. 7 illustrates a flowchart of a method of obtaining synchronization signal information by a UE, in accordance with some embodiments of the invention.

FIG. 7 illustrates a flow chart of a process wherein a UE obtains SS's from a plurality of cells based on candidate time locations for SS's of the plurality of cells, in accordance with some embodiments of the invention. In some embodiments, the process of FIG. 7 can be implemented as a specific exemplary implementation of the process of FIG. 6 discussed above. Referring again to FIG. 7, in the first step 701, a UE obtains information that the SS of a detected cell is in a SS burst. This could represent the first two steps 601 and 602 in FIG. 6 in various embodiments. The UE could first obtain the information about cells in a SS burst and second detect one of the cells among those, in some embodiments. In some embodiments, the UE could first detect a cell and then obtain the SS burst information.

Figure 8:
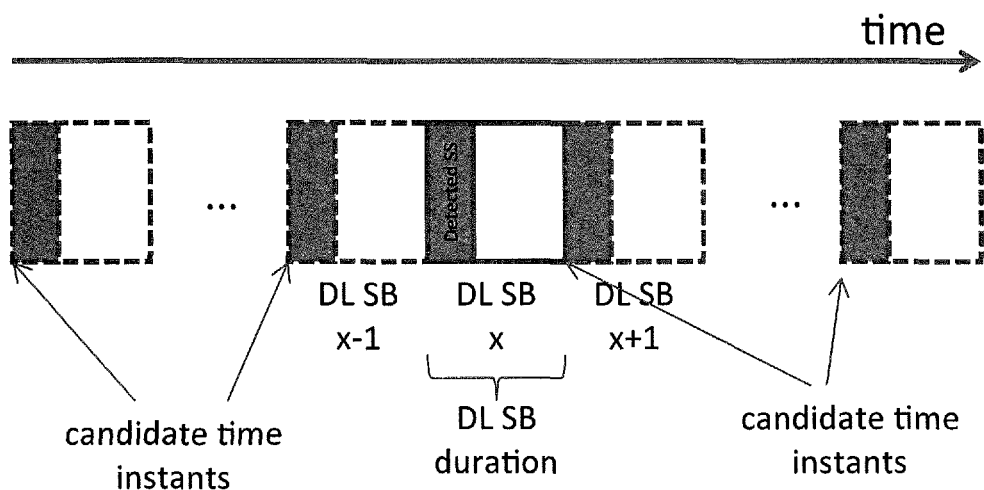
FIG. 8 illustrates an SS burst from which a UE can obtain candidate time locations of SS's of other cells, in accordance with some embodiments of the invention.

In the second step 702, the UE obtains candidate time locations for SS's of other cells. This step is based on a scenario in which the UE knows the time difference between DL SBs, and thereby between SSs. This knowledge may be predefined based on the carrier frequency or configured for the UE, as described in various embodiments above. How refined or accurate the candidate time locations can be may depend on the level of information about the SS burst that the UE has obtained. For example, if the UE only knows (or assumes) that the already detected SS is part of a SS burst, then the UE can include all other undetected cells as candidates, and the candidate time differences will be integer multiples of a smallest time interval, e.g. a DL SB duration, with the detected cell's SS as a reference point. This scenario is illustrated in FIG. 8, where an SS is detected by a UE that knows that the cell is part of a SS burst having a plurality of sequential DL SB's, each SB containing respective SS information. In some embodiments, the UE need not know where in the burst the SS is transmitted. In some embodiments, the UE has obtained further time information, for example the DL SB index of the detected cell. In this case, the UE knows at least how many DL SBs that precede the DL SB with the detected cell. In some embodiments, the UE has obtained the total number of DL SBs in the burst. This information can limit the number of candidate time instants back and forth to the total number. Combined with information of the DL SB index of the detected cell, the UE may know both the first and last DL SB.

At step 703, the UE searches for cells on the candidate time instants. If no detailed information is obtained, the UE may make an unrestricted search of other cells in the candidate time instants before and after the DL SB in which the SS was detected. Also the same DL SB may be a candidate time instant. In some embodiments, the number of candidate time instants can be limited by a predefined maximum number of DL SBs.

In some embodiments, the UE obtains further information about other cells that transmit SS in the SS burst. In this case, the UE can limit the search at the candidate time instants to PCIs/cells in this set. In some embodiments, the UE also obtains further time information of the individual cells, such as DL SB index within the burst, or cell order. In such embodiments, the UE can further limit the cell search in the different candidate time instants.

At step 704, the UE detects another cell in the SS burst at a candidate time location and obtains the corresponding SS. The UE may continuously use the SS burst structure to detect, measure and monitor neighbor cells.

Figure 9:
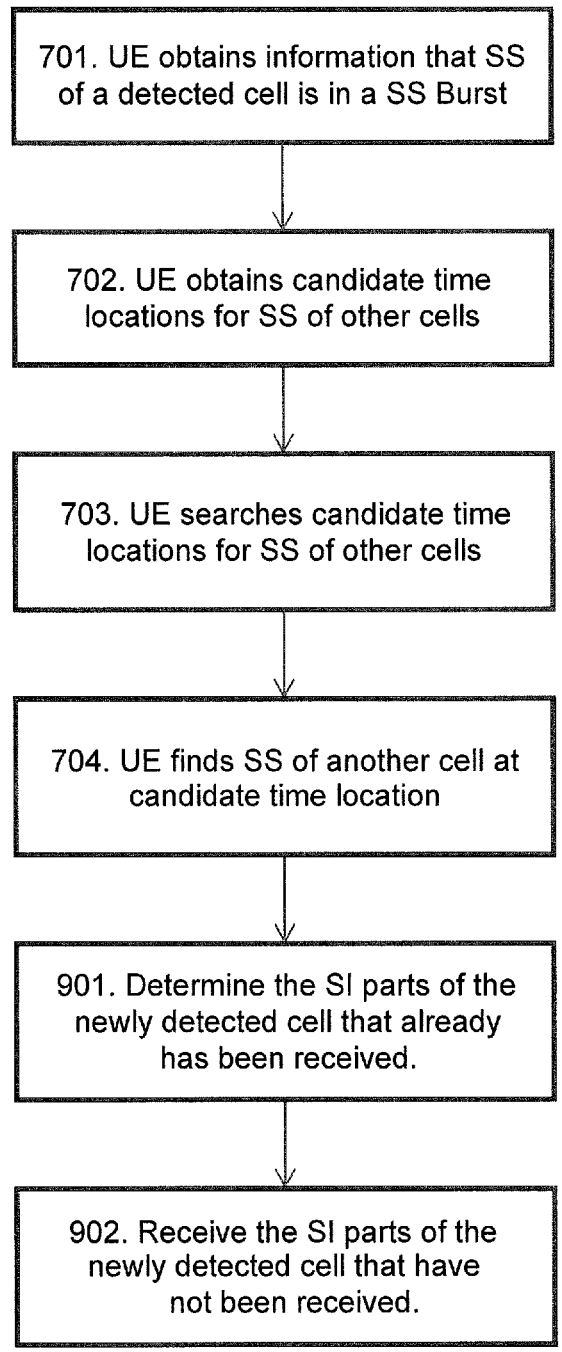
FIG. 9 illustrates a flowchart of a method of receiving system information from a newly detected cell that has not been previously received, in accordance with some embodiments of the invention.

FIG. 9 illustrates a flow chart of a process of further receiving SI parts of newly detected cells that builds upon the process of FIG. 7, in accordance with various embodiments of the invention. It is noted that the first four steps 701-704 of FIG. 9 are the same as the corresponding steps shown in FIG. 7. Therefore, a description of such steps is not repeated here.

After step 704, at step 901, the UE determines for the newly detected cells which SI parts that it has already obtained. This is done by examining the obtained information about SI groups, as described in various embodiments above. If the cell belongs to an SI group for which the corresponding SI part has already been received, the UE can use the already received SI part.

Next, at step 902, the UE receives SI parts of the newly detected cell that have not already been received, based on the SI group information.

Various Mobility-related Embodiments

As the UE or other objects move or changes with time, the perceived radio propagation conditions change. This can be handled with various mechanisms. One way to characterize the mobility is into low-level mobility and high-level mobility. In various embodiments, low-level mobility may be handled in the PHY and/or MAC layers. In various embodiments, high-level mobility may be handled in the RRC layer. Examples of low-level mobility are link adaptation and coordinated multi-point (CoMP) transmission and reception. An example of high-level mobility is hand over and configuration of a secondary cell. Mobility on lower levels, such as PHY or MAC, involves signaling at that level or layer, between UE and network entities, such as eNB, gNB, etc. Similarly, mobility on higher levels, such as on the RRC layer, involves signaling between UE and network on the higher level/layer. Note that high-level mobility may also involve low-level signaling, in various embodiments.

In state-of-the-art systems, mobility between cells is handled with high-level mobility, such as on the RRC layer in various embodiments. In various embodiments, cells are connected to the PCI of an SS. In other words, different cells use different SS with different PCI, at least within some area since PCIs in a limited set need to be reused in a large network. UE mobility between cells may include changing the SS which the UE uses as basic time and/or frequency reference for DL and/or uplink (UL) communication, in some embodiments. It can also include changing various configurations or parameters based on which cell that is currently strongest or in other ways more suitable, in some embodiments. The strongest cell can be determined based on UE measurements on SS or other cell-related signals, such as reference signals.

In various embodiments of the present invention, however, mobility between cells is handled with low-level mobility, e.g., at PHY and/or MAC layers. In various embodiments, UE mobility between cells that transmit SS in the same SS burst is handled by low-level signaling, e.g. at PHY and/or MAC. In various embodiments, UE mobility between cells that do not transmit SS's in the same SS burst is handled by high-level mobility signaling, e.g. at the RRC layer. In some embodiments, UE mobility between cells that belong to the same SI group is handled by low-level signaling, e.g., at the PHY and/or MAC layers.

Various embodiments of low-level signaling, e.g., at the PHY and/or MAC layers, are listed below:

UE measures and reports channel quality indicator (CQI) corresponding to one or more cells in a SS burst or SI group.

UE measures and reports precoder matrix indicator (PMI) corresponding to one or more cells in a SS burst or SI group.

UE measures and reports rank indicator (RI) corresponding to one or more cells in a SS burst or SI group.

UE measures and reports received signal power corresponding to one or more cells in a SS burst or SI group.

UE measures and reports received SNR or SINR corresponding to one or more cells in a SS burst or SI group.

UE measures and reports interference power level corresponding to one or more cells in a SS burst or SI group.

Network schedules a UE transmission, with a cell in a SS burst or SI group as time and/or frequency reference (for the transmission).

Subsequent DL transmissions from different cells in a SS burst or SI group include an additional SS and/or RS embedded in the DL transmission, i.e. not as a part of a SS burst. This could indicate to the UE from which cell in a SS burst or SI group the transmission comes from and/or furthermore provide an additional synchronization opportunity.

Network informs UE which cell in a SS burst or SI group that the UE should use for time and/or frequency reference in UL transmissions.

In some embodiments, the network provides a timing advance (TA) configuration together with an indication on which cell in a SS burst of SI group that the TA configuration is based on, i.e. to which cell's time and/or frequency reference it refers to.

For each of the low-level signaling functions, mobility on lower layer is enabled by the combination of the following aspects: (1) sufficient synchronization and coordination between the cells involved in the mobility; (2) the signal structure of SS blocks, SS bursts, SS burst sets; (3) the UE knowledge of this signal structure; and (4) various combinations of the low-level measurements, reports, etc., described above.

The word "exemplary" is used herein to mean "serving as an example or illustration." Any aspect or design described herein as "exemplary" is not necessarily to be construed as preferred or advantageous over other aspects or designs.

While one or more embodiments of the invention have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by an appropriately configured module. The term "module" as used herein, refers to software that is executed by one or more processors, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A method of acquiring information by a user equipment device (UE) from a plurality of cells in a wireless communication system, the method comprising:
    obtaining information about a synchronization signal (SS) burst, the SS burst comprising a plurality of SS blocks (SB's), wherein the information comprises a time difference between two or more SB's;
    synchronizing to a first cell identified in the SS burst; and
    using the time difference between the two or more SB's to find at least one other cell in the wireless communication system capable of communicating with the UE from the SS burst.

2. The method of claim 1 wherein the time difference is depends on a carrier frequency of the SS burst.

3. The method of claim 2 wherein the time difference is an integer multiple of a predetermined smaller time interval that is predefined for a predetermined carrier frequency or range of carrier frequencies.

4. The method of claim 3 wherein the predetermined smaller time interval is a duration of a SB.

5. The method of claim 3 wherein the predetermined smaller time interval is a duration of one orthogonal frequency division multiplexing (OFDM) symbol.

6. The method of claim 5 wherein a deviation in the time difference is less than a duration of a cyclic prefix (CP) in the OFDM symbol.

7. The method of claim 1 wherein the SS burst is periodically transmitted after a predetermined period of time.

8. The method of claim 1 wherein the information comprises a first list of cells that transmit synchronization signals (SS's) using the SS burst.

9. The method of claim 8 wherein the time difference indicates a time difference between at least two SS's transmitted by at least two respective cells identified in the list of cells.

10. The method of claim 8 wherein the information comprises a second list of cells that transmit SS's using a different SS burst.

11. The method of claim 8 wherein each SB in the SS burst contains at least one SS corresponding to at least one cell in the first list.

12. The method of claim 11 wherein at least one SB in the SS burst contains at least two SS's corresponding to at least two cells in the first list, respectively.

13. The method of claim 1 further comprising:
    determining if any system information for the at least one other cell is the same as system information received for the first cell; and
    receiving any system information for the at least one other cell which is not the same as system information received for the first cell.

14. A non-transitory computer-readable medium storing computer executable instructions that when executed perform a method of acquiring information from a plurality of cells in a wireless communication system, the method comprising:
    obtaining information about a synchronization signal (SS) burst, the SS burst comprising a plurality of SS blocks (SB's), wherein the information comprises a time difference between two or more SB's;
    synchronizing to a first cell identified in the SS burst; and using the time difference between the two or more SB's to find at least one other cell in the wireless communication system capable of communicating with the UE from the SS burst.

15. The non-transitory computer-readable medium of claim 14 wherein the time difference is depends on a carrier frequency of the SS burst.

16. The non-transitory computer-readable medium of claim 15 wherein the time difference is an integer multiple of a predetermined smaller time interval that is predefined for a predetermined carrier frequency or range of carrier frequencies.

17. The non-transitory computer-readable medium of claim 16 wherein the predetermined smaller time interval is a duration of a SB.

18. The non-transitory computer-readable medium of claim 16 wherein the predetermined smaller time interval is a duration of one orthogonal frequency division multiplexing (OFDM) symbol.

19. The non-transitory computer-readable medium of claim 18 wherein a deviation in the time difference is less than a duration of a cyclic prefix (CP) in the OFDM symbol.

20. The non-transitory computer-readable medium of claim 14 wherein the SS burst is periodically transmitted after a predetermined period of time.

21. The non-transitory computer-readable medium of claim 14 wherein the information comprises a first list of cells that transmit synchronization signals (SS's) using the SS burst.

22. The non-transitory computer-readable medium of claim 21 wherein the time difference indicates a time difference between at least two SS's transmitted by at least two respective cells identified in the list of cells.

23. The non-transitory computer-readable medium of claim 21 wherein the information comprises a second list of cells that transmit SS's using a different SS burst.

24. The non-transitory computer-readable medium of claim 21 wherein each SB in the SS burst contains at least one SS corresponding to at least one cell in the first list.

25. The non-transitory computer-readable medium of claim 24 wherein at least one SB in the SS burst contains at least two SS's corresponding to at least two cells in the first list, respectively.

26. The non-transitory computer-readable medium of claim 14, wherein the method further comprises:
  determining if any system information for the at least one other cell is the same as system information received for the first cell; and
  receiving any system information for the at least one other cell which is not the same as system information received for the first cell.

* * * * *